United States Patent
Shoner

(10) Patent No.: US 7,513,282 B1
(45) Date of Patent: Apr. 7, 2009

(54) AIR BLADDER FOR TIRE LINERS WITH VEE SHAPED AIR CHAMBERS

(76) Inventor: Douglas Joseph Shoner, 12244 Truro Ave., Hawthorne, CA (US) 90250-3622

( * ) Notice: Subject to any disclaimer, the term of this patent is extended or adjusted under 35 U.S.C. 154(b) by 221 days.

(21) Appl. No.: 11/422,590

(22) Filed: Jun. 6, 2006

Related U.S. Application Data

(60) Provisional application No. 60/687,683, filed on Jun. 6, 2005.

(51) Int. Cl.
| B60C 5/00 | (2006.01) |
| B60C 5/04 | (2006.01) |
| B60C 5/08 | (2006.01) |

(52) U.S. Cl. .................. 152/510; 152/155; 152/450; 152/511; 152/512

(58) Field of Classification Search ........... 152/512, 152/155, 157, 158
See application file for complete search history.

(56) References Cited

U.S. PATENT DOCUMENTS

| 1,203,654 | A | * | 11/1916 | Schaap | 152/512 |
| 1,325,233 | A | * | 12/1919 | Cooper | 152/339.1 |
| 1,510,747 | A | * | 10/1924 | Privett | 152/508 |
| 1,952,221 | A | * | 3/1934 | Ronneberg | 152/342.1 |
| 2,067,545 | A | * | 1/1937 | Ricketts, Jr. | 152/339.1 |
| 2,354,442 | A | * | 7/1944 | Wilson et al. | 152/341.1 |
| 6,116,308 | A | * | 9/2000 | Yoshida | 152/158 |

FOREIGN PATENT DOCUMENTS

| DE | 3210595 | * | 10/1983 |
| EP | 0090221 | * | 10/1983 |
| FR | 2639880 | * | 6/1990 |
| JP | 63-11402 | * | 1/1988 |
| JP | 2000-17739 | * | 6/2000 |
| JP | 200267610 | * | 3/2002 |

* cited by examiner

Primary Examiner—Justin Fischer

(57) ABSTRACT

A vee shaped Air Bladder for hermetically sealing the pressurized air chamber of tire liners that have vee shaped air chambers. The vee shaped Air Bladder being molded with a desired vee shape portion. The vee shaped Air Bladder precluding any pressurized gas from coming between the interior surface of the tire and the tire liner.

6 Claims, 7 Drawing Sheets

AIR BLADDER FOR TIRE LINERS WITH VEE SHAPED AIR CHAMBERS

This nonprovisional utility patent application claims the benefit of U.S. Provisional Application No. 60/687,683 filed on Jun. 6, 2005.

BACKGROUND OF THE INVENTION

The present invention is in the general field of tire liners for pneumatic tires that have a pressurized air chamber inside the tire and wheel assembly, which is sealed to preclude any pressurized gas from coming between the interior surface of the tire and the tire liner. Specifically, the present invention is an improved means to seal the pressurized air chamber of tire liners that have vee shaped air chambers.

One such tire liner with a vee shaped air chamber is described in Applicant's U.S. Pat. No. 6,568,443. The vee shaped air chamber created by the tire liners described therein, is sealed by means of an "inner tube." The inner tube referred to is the conventional type of rubber inner tube used in the tire industry. These conventional rubber inner tubes are manufactured in molds that have a round cross section and therefore produce inner tubes that also have a round cross sections, as molded.

Applicant has discovered that there are problems with using "round" inner tubes to seal a "vee shaped" air chamber. The problem is that a conventional round inner tube and a vee shaped air chamber are incompatible, because of their extremely dissimilar shapes. When using a conventional round inner tube to seal a vee shaped air chamber, the conventional round inner tube either (1) "wads" or "bunches" up in the bottom of the vee, the portion of the air chamber closest to the tread, or (2) stretches into the bottom of the vee, thereby placing an extreme tension load on that portion of the conventional round inner tube.

Regarding the "wadding" or "bunching-up" in the bottom of the vee, when using a conventional round inner tube with the seemingly correct diameter and cross section dimensions to seal an intended vee shaped air chamber, the round inner tube simply has to much surface area. Three dimensionally, a conventional "round" inner "tube" is a circular tube and the vee shaped portion of the air chamber is essentially two "cone segments." A conventional round inner tube with (1) a circumference dimension the same as the perimeter cross section dimension of the intended complete vee shaped air chamber that is parallel with the rotational axis of the tire, and (2) an outside diameter that is the same dimension as the maximum inside diameter of the intended vee shaped air chamber, i.e., the dimension from the bottom of the vee (point closest to the tread) on one side, straight across to the bottom of the vee on the other side, this conventional round inner tube has substantially more surface area than the surface area of the complete vee shaped air chamber. This circumstance causes the "wadding" or "bunching-up" of the excess conventional inner tube in the bottom of the vee shaped air chamber. This is illustrated in FIG. 6. In FIG. 6 there is shown conventional round inner tube 27 with over-all dimensions that correspond to the over-all dimensions of the vee shaped air chamber that it is intended to be used in, as described above, and conventional inner tube 27 is pressurized inside the intended vee shaped air chamber. As the FIG. 6 illustration shows, the conventional inner tube excess "wads" or "bunches" up in the bottom of the vee shaped air chamber creating folds. These folds cause (1) detrimental heat to be generated from the friction of the folds rubbing against each other when in a tire that is being use on the highway and (2) the folds rubbing against each other will rub a hole completely through conventional inner tube 27, which allows pressurized air to now go between the interior surface of the tire and the tire liner. When the pressurized air is allowed to get between the interior surface of the tire and the tire liner through the hole rubbed in conventional inner tube 27, this equalizes the air pressure force on both sides of the tire liner. When the air pressure is equal on both sides of a tire liner inside a tire, the tire liner abrades the interior surface of the tire, damaging the tire. Because there is no pressure differential to press the tire liner against the interior surface of the tire and keep it from rubbing against the interior surface.

A conventional round inner tube with over-all dimensions that correspond to the over-all dimensions of a vee shaped air chamber that it is intended to be used in, does not provide a functional means of sealing a vee shaped air chamber because of the inherent, insurmountable surface area problem that generates detrimental heat and ultimately holes in the conventional round inner tube. Thereby defeating its sole purpose of sealing the air chamber.

Attempts to eliminate the "wadding" and "bunching-up" in the bottom of the vee problem set forth above by using a conventional round inner tube with over-all dimensions that are less than the over-all dimensions of the vee shaped air chamber that it is intended to be used in, the conventional round inner tube now having less surface area than the intended complete vee shaped air chamber, creates an extreme tension load problem.

The "vee shape" of the air chamber causes a round inner tube with over-all dimensions that are less than the over-all dimensions of the intended complete vee shaped air chamber, to "thrust" out of the vee shaped air chamber toward the wheel during initial pressurization. Which ultimately results in an extreme tension load being placed on the conventional round inner tube. This problem is illustrated in FIGS. 7, 8 and 9.

In FIG. 7 there is shown a cross section of a conventional round inner tube 25 as molded. In FIG. 7 there is also shown a cross section of a tire and wheel assembly that includes a tire liner that creates a vee shaped portion of the complete air chamber. And in the air chamber of this assembly is conventional inner tube 25 which has over-all dimensions that are less than the over-all dimensions of the vee shaped air chamber and conventional inner tube 25 is unpressurized.

FIG. 8 shows the same tire and wheel assembly cross section that is shown in FIG. 7, except that now conventional inner tube 25 has begun to have pressurized air introduced into it. This initial pressurization period, when the pressure in conventional inner tube 25 is approximately two (2) or three (3) PSI, is what causes the "thrusting" problem. Two (2) or three (3) PSI is not enough air pressure force to hold conventional inner tube 25 stationary against the vee shaped surface portion of the air chamber to counteract the inherent characteristic of the vee shape to eject a round inner tube expanding in it. Two (2) or three (3) PSI is however, enough air pressure force to cause conventional inner tube 25 to thrust out of the vee shaped air chamber toward the wheel. FIG. 8 illustrates this thrusting toward the wheel problem during initial pressurization. FIG. 8 shows during initial pressurization, with approximately two (2) or three (3) PSI in conventional inner tube 25, conventional inner tube 25 has pulled away from the bottom of the vee shaped air chamber, i.e., the part of the air chamber closest to the tire tread, as shown in FIG. 7, and has thrust toward the wheel.

As the air pressure in conventional inner tube 25 is increased beyond the initial pressurization pressure, conventional inner tube 25 now begins to stretch back toward the bottom of the vee shaped air chamber. And when conventional inner tube 25 is pressurized to the required pressure for tire liner applications intended for highway use, conventional inner tube 25 has stretched all the way back to the bottom of the vee shaped air chamber. This is illustrated in FIG. 9 which shows the progression of conventional inner tube 25 as it stretches back toward the bottom of the vee shaped air chamber as the air pressure is increased beyond the initial pressurization pressure. This stretching places the portion of conventional inner tube 25 that has stretched all the way back to the bottom of the vee, under an extreme tension load.

The tension load illustrated in FIG. 9 becomes a dynamic, cyclical tension load when the tire is put to uses on a vehicle. When under the load between the axel and the ground, that portion of conventional inner tube 25 under an extreme tension load, now moves back toward the wheel. And therefore back toward a neutral load thereby significantly reducing the tension load. As the tire rotates and that portion of conventional inner tube 25 is no longer between the axel and the ground, it move back to its normal pressurized position, restoring the tension load. Cycling like this for every revolution of the tire. This cycling during highway use generates so much heat that it causes the portion of conventional inner tube 25 under this extreme tension load to fail and the tire liner portion in contact with it to be damaged.

A conventional round inner tube with over-all dimensions that are less than the over-all dimensions of a vee shaped air chamber that it is intended to be used in, does not provide a functional means of sealing a vee shaped air chamber because of the inherent, insurmountable extreme tension load problem that results from the conventional round inner tube having to stretch into the bottom of the vee shaped air chamber.

BRIEF SUMMARY OF THE INVENTION

The present invention is a vee shaped Air Bladder for hermetically sealing the pressurized air chamber of tire liners that have air chambers that are vee shaped. The present invention Air Bladder in its "as molded" state, has a vee shaped portion that conforms to the vee shaped portion of the intended air chamber prior to pressurization. The present invention Air Bladder does not have to be pressurized inside a vee shaped air chamber to assume the vee shape and dimensions of the intended air chamber. The object of the present invention is to provide a means of hermetically sealing pressurized vee shaped air chambers that is free of the extreme tension load and the excessive surface area problems associated with the use of conventional round inner tubes to seal vee shaped air chambers.

REFERENCE NUMERALS IN THE DRAWINGS

1—complete mold containing the Air Bladder of the present invention in the mold cavity
1a—external mold half
1b—external mold half
2a—internal mold section
2b—internal mold section
3—Air Bladder of the present invention
7—individual reinforcing fibers
15—pneumatic tire containing tire liners that form a vee shaped air chamber
20—one-piece drop center wheel
25—conventional round inner tube with over-all dimensions that are less than the over-all dimensions of the vee shaped air chamber intended to be used in
27—conventional round inner tube with over-all dimensions that correspond to the over-all dimensions of the vee shaped air chamber intended to be used in
50—vee shaped air chamber

DETAILED DESCRIPTION OF THE INVENTION

Figure 1:
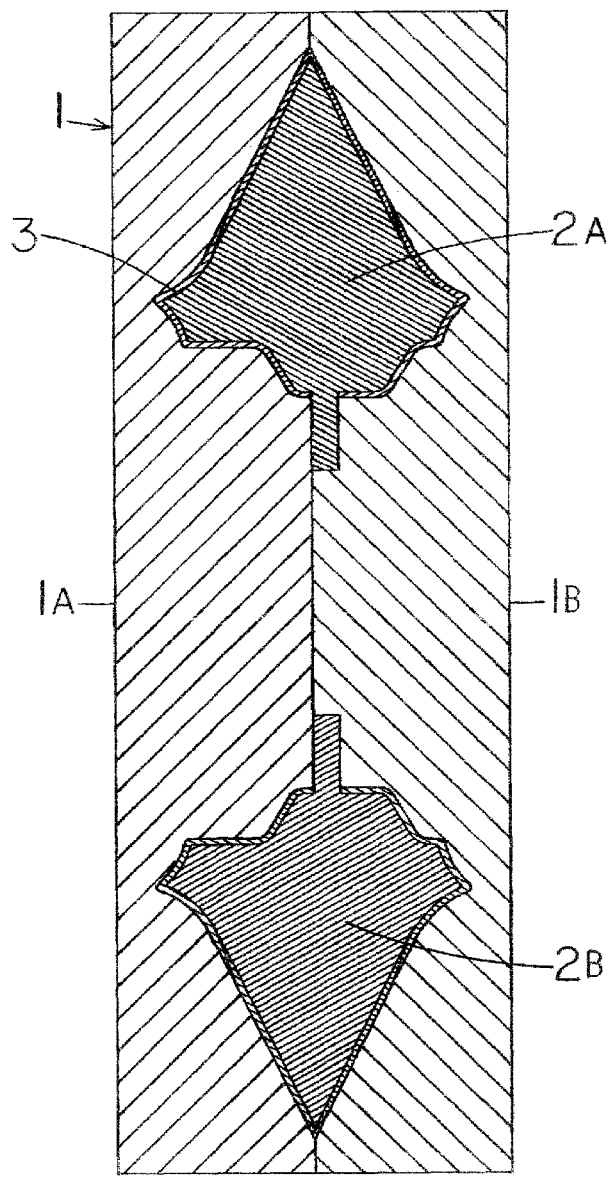
FIG. 1 is a cross sectional view of the Air Bladder of the present invention being manufactured in the cavity of a mold.

A cross sectional view of the Air Bladder of the present invention being manufactured is shown in FIG. 1. In FIG. 1 there is shown complete mold 1, external mold halves 1a and 1b, internal mold sections 2a and 2b and the Air Bladder of the present invention 3. Mold 1 illustrates a mold used for injection molding or liquid injection molding (LIM) to manufacture the Air Bladder of the present invention. This is indicated by the use of internal mold sections 2a and 2b. When the Air Bladder of the present invention is manufactured from injection molding methods, a subsequent step or steps are required to complete the Air Bladder. The Air Bladder of the present invention can also be made in one molding operation. In this case internal mold sections 2a and 2b are not used and an annular tube of uncured rubber or any other suitable elastomer, is placed in the mold cavity of mold 1 and expanded with compressed air until contact is made with the entire surface of the mold cavity. The rubber is then cured while in this state. This method will produce a complete Air Bladder of the present invention in one molding operation. No additional steps are required to complete the Air Bladder using this method.

FIG. 1 shows the Air Bladder of the present invention 3 in its "as molded" state. The Air Bladder of the present invention has a vee shaped portion that conforms to the vee shape and dimensions of the air chamber for which it will be used in "as molded" because the Air Bladder of the present invention is manufactured in a mold cavity that has the desired vee shape and dimensions of the air chamber for which it will be used in.

The Air Bladder of the present invention is made of an elastomeric material such as rubber, any synthetic rubbers or any synthetic elastomers. The preferred elastomeric material used to construct the Air Bladder of the present invention 3 is a low heat build-up polyurethane elastomer compound.

Figure 2:
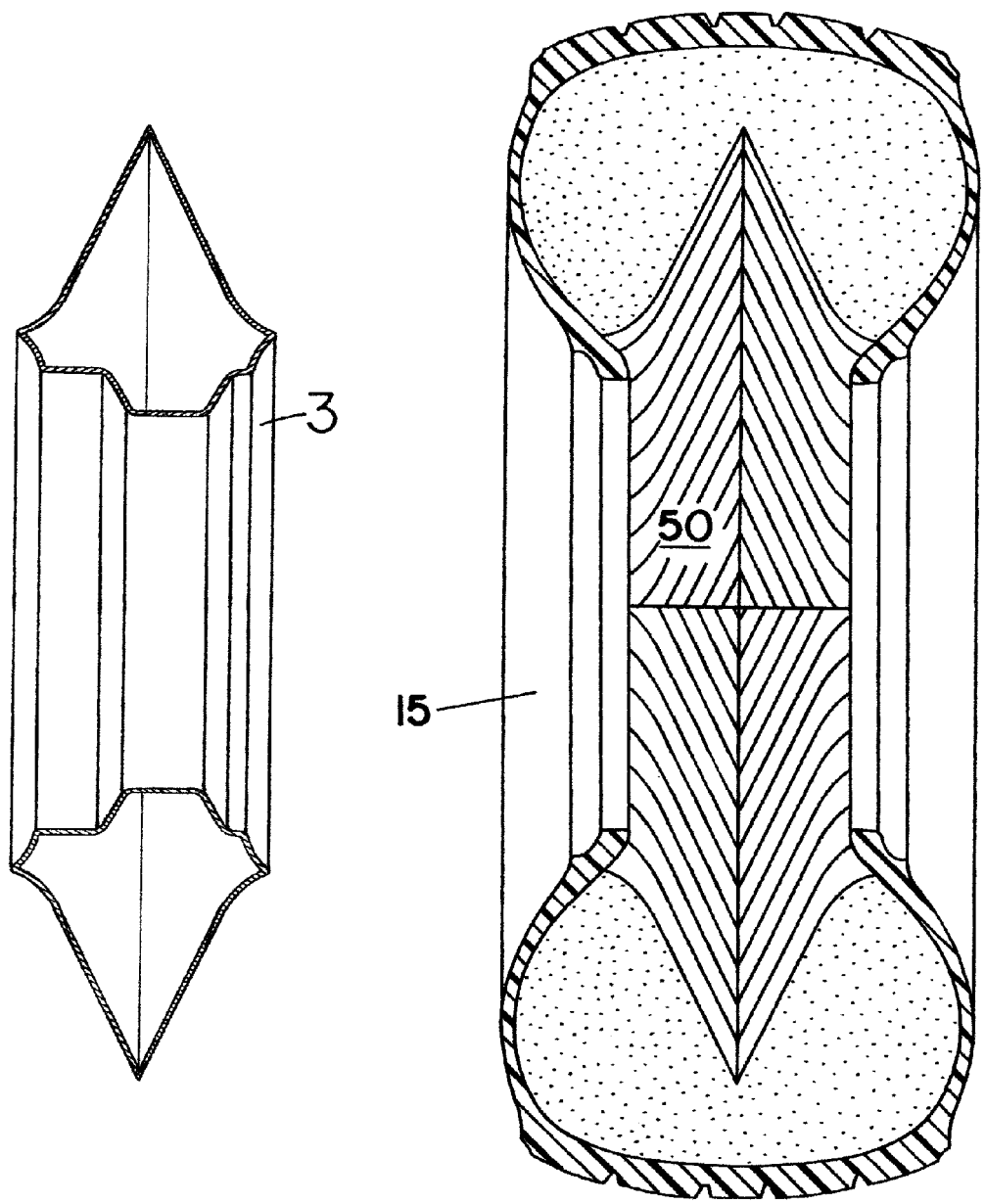
FIG. 2 is a cross sectional view of the Air Bladder of the present invention and a pneumatic tire that is lined with a tire liner that has a vee shaped air chamber, showing the completed Air Bladder of the present invention positioned outside of and next to a tire lined with a tire liner that has a vee shaped air chamber.

The present invention and its advantage over the prior art is easily understood by the FIG. 2 illustration. FIG. 2 is a cross sectional view of the Air Bladder of the present invention outside of and positioned next to a pneumatic tire that is lined with a tire liner which has a vee shaped air chamber. In FIG. 2 there is shown the Air Bladder of the present invention 3, pneumatic tire that is lined with a tire liner 15 and vee shaped air chamber 50. The construction of the Air Bladder of the present invention 3 in FIG. 2 is complete. The completed Air Bladder of the present invention 3 in FIG. 2 is a hollow, hermetically sealed, airtight elastomeric structure. The completed Air Bladder of the present invention 3 outside of tire 15 in FIG. 2 clearly shows that the Air Bladder of the present invention 3 does not have to be pressurized inside tire 15 to assume the shape and dimensions of vee shaped air chamber 50. Because the Air Bladder of the present invention 3 is molded and cured/vulcanized in the desired vee shape and dimensions of vee shaped air chamber 50 and the subsequently mounted one-piece drop center wheel.

Figure 3:
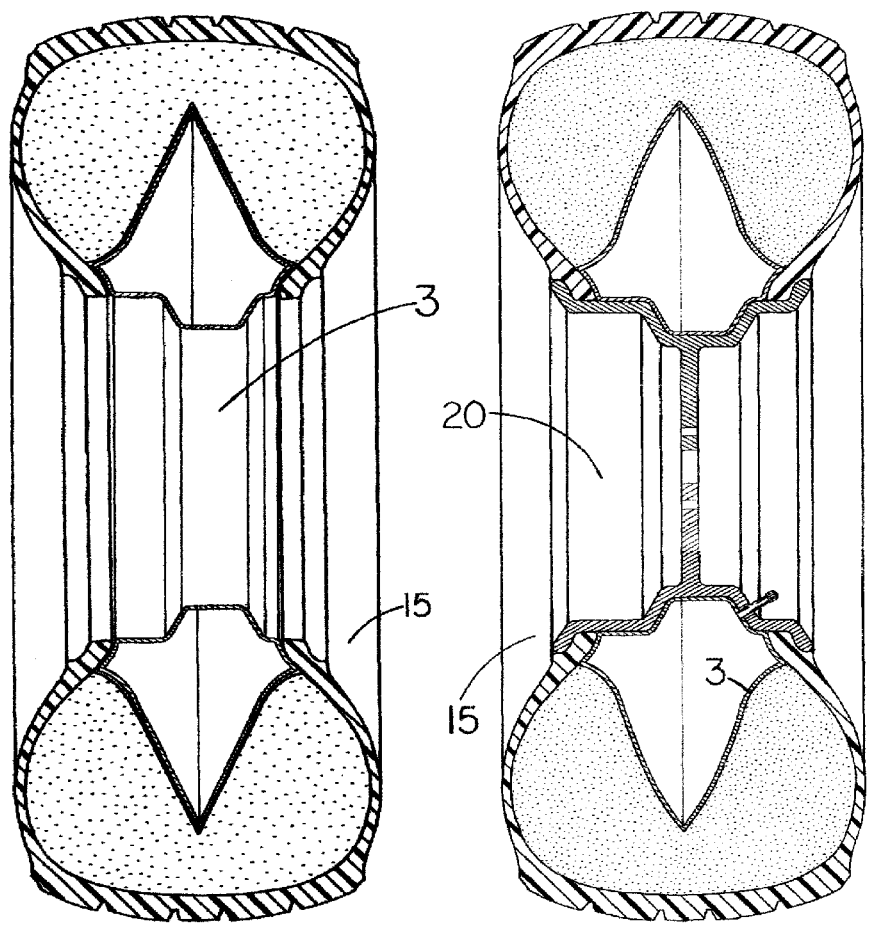
FIG. 3 is a cross sectional view of the Air Bladder of the present invention and the pneumatic tires illustrated in FIG. 2, showing the Air Bladder of the present invention installed for use in the lined tire and the lined tire including the Air Bladder of the present invention subsequently mounted onto a wheel and the Air Bladder of the present invention pressurized.

FIG. 3 is a cross sectional view of the Air Bladder of the present invention installed for use in a tire with a vee shaped air chamber and this same tire subsequently mounted onto a wheel. In FIG. 3 there is shown the completed Air Bladder of the present invention 3 shown in FIG. 2, pneumatic tire 15 which is lined with a tire liner that has a vee shaped air chamber and the same tire 15 subsequently mounted onto one-piece drop center wheel 20. In FIG. 3, the Air Bladder of the present invention 3 is shown installed in the vee shaped air chamber of lined tire 15 unpressurized, before tire 15 is mounted onto wheel 20. FIG. 3 clearly shows that the Air Bladder of the present invention 3 conforms to the vee shape and dimensions of the air chamber "as molded", without having to be pressurized with air. This "unpressurized conformance" of the vee shaped Air Bladder of the present invention is what eliminates the problems that result from the use of a conventional round inner tube to seal a vee shaped air chamber. Namely, the problem of the excess surface area of the conventional round inner tube "wadding" or "bunching-up" in the bottom of the vee shaped air chamber and the problem of an extreme tension load that results from use of a smaller conventional round inner tube to try and eliminate the "wadding" and "bunching" problem.

FIG. 3 also illustrates putting the Air Bladder of the present invention to use. In operation, the completed Air Bladder of the present invention 3 is installed in the vee shaped air chamber created by the tire liner(s) lining the interior of tire 15. The Air Bladder of the present invention 3 has the typical valve to allow pressurization of the Air Bladder. Pneumatic tire 15 containing the Air Bladder of the present invention 3 is then mounted onto one-piece drop center wheel 20. The Air Bladder of the present invention 3 is then pressurized to a desired pressure. The tire and wheel assembly containing the Air Bladder of the present invention is now ready for use.

Figure 4:
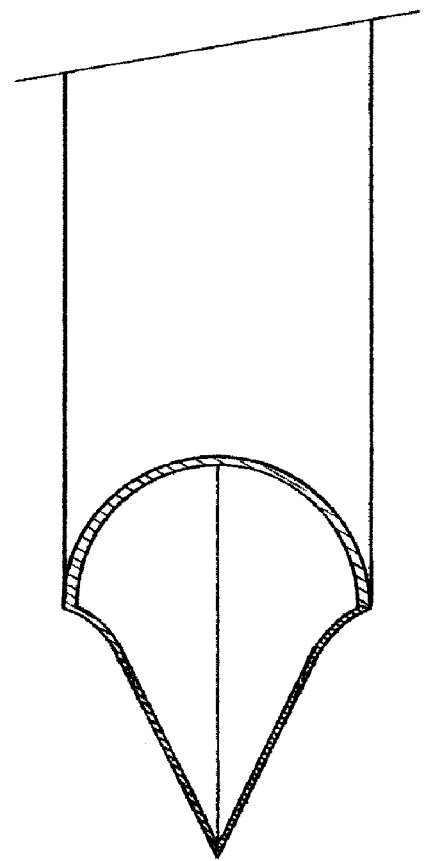
FIG. 4 is a partial cross sectional view of an alternative embodiment of the present invention, showing the portion of the Air Bladder of the present invention that will contact the wheel being a universal semicircular shape to accommodate different wheel profiles.

FIG. 4 is a partial cross sectional view of an alternative embodiment of the Air Bladder of the present invention. The portion of the Air Bladder that contacts the vee shaped air chamber continues to be molded in the shape and dimensions of the intended vee shaped air chamber. However, the portion of the Air Bladder that will come in contact with the wheel is semicircular. This semicircular "universal" configuration, allows this embodiment of the present invention to accommodate a number of different shapes of the drop center portion of different wheels. Rather than having to mold a number of Air Bladders of the present invention for different wheel profiles. The portion of the Air Bladder that is in contact with the wheel is static. There is no movement. Therefore any stretching or bunching-up of this portion of the Air Bladder does not cause a problem because there is no movement. It is desirable however, to have the radius of this semicircular portion large enough to provide sufficient material to contact the entire wheel with little or no stretching.

Figure 5:
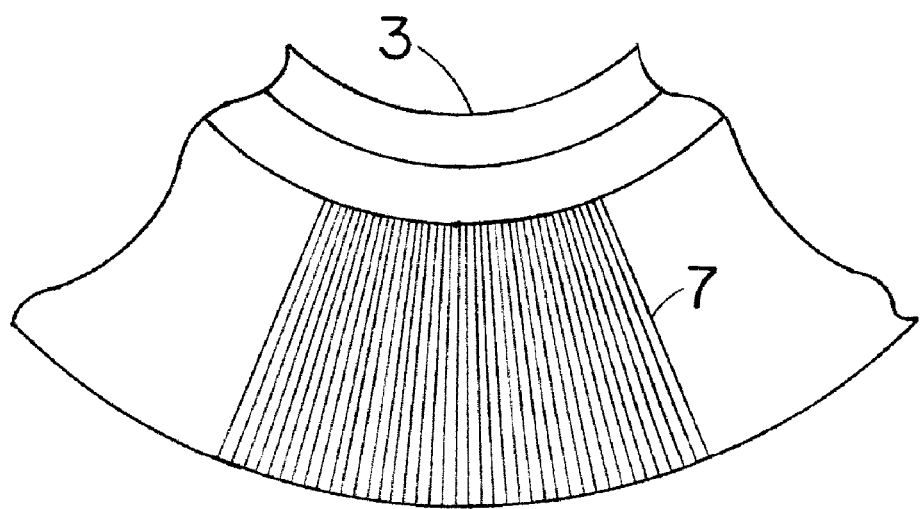
FIG. 5 is a partial view showing the Air Bladder of the present invention reinforced with fibers.
Figure 6:
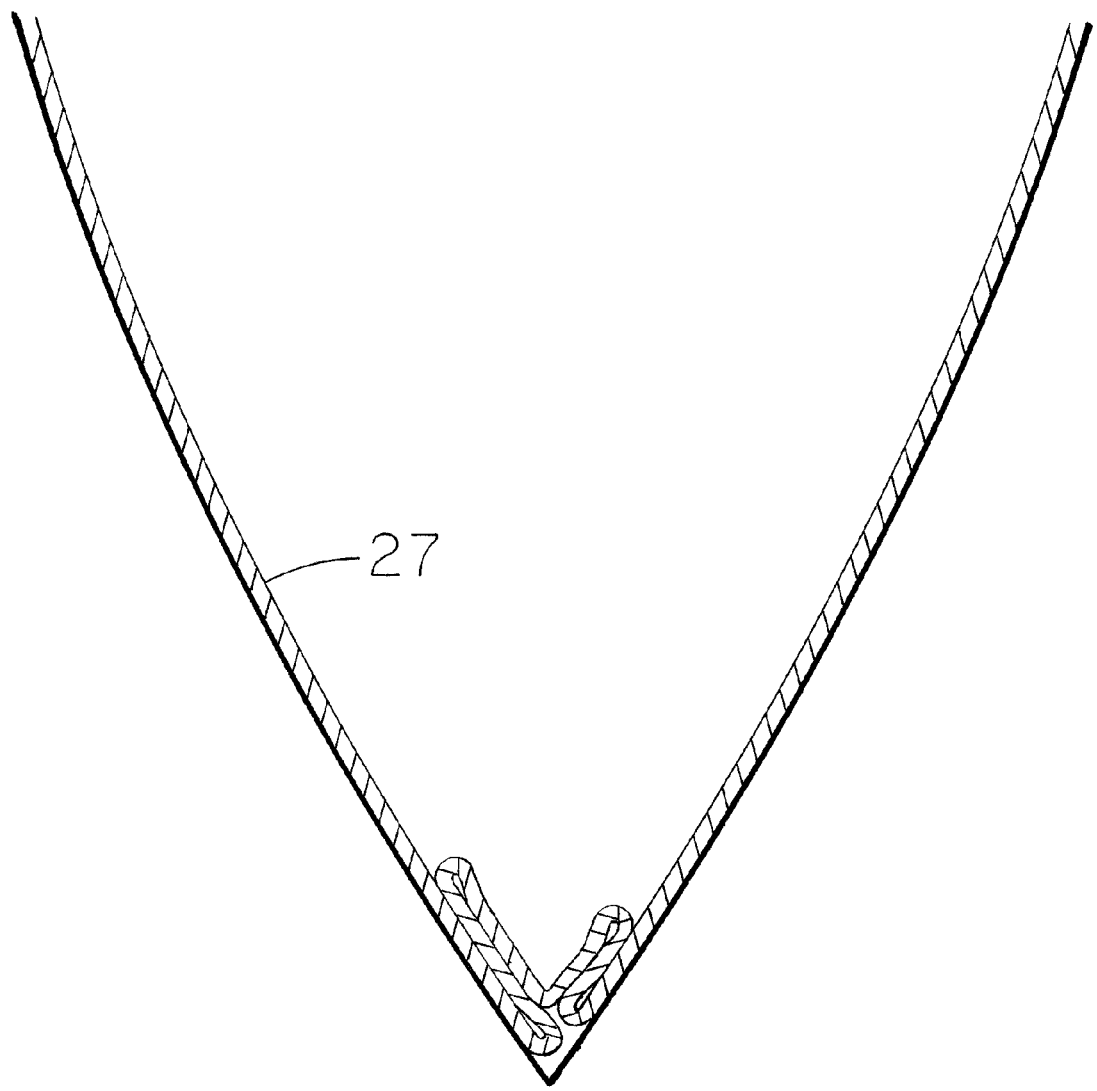
FIG. 6 is an illustration of the "wadding" or "bunching-up" of the excess conventional round inner tube in the bottom of a vee shaped air chamber.
Figure 7:
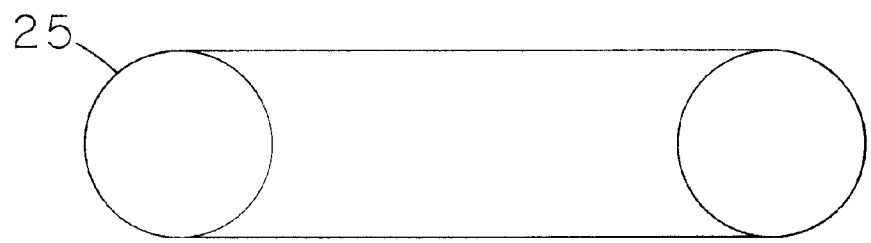
FIG. 7 is a cross sectional view of a conventional round inner tube as molded and a tire and wheel assembly that includes a tire liner that creates a vee shaped portion of the complete air chamber with a conventional round inner tube that is unpressurized in the air chamber.
Figure 7:
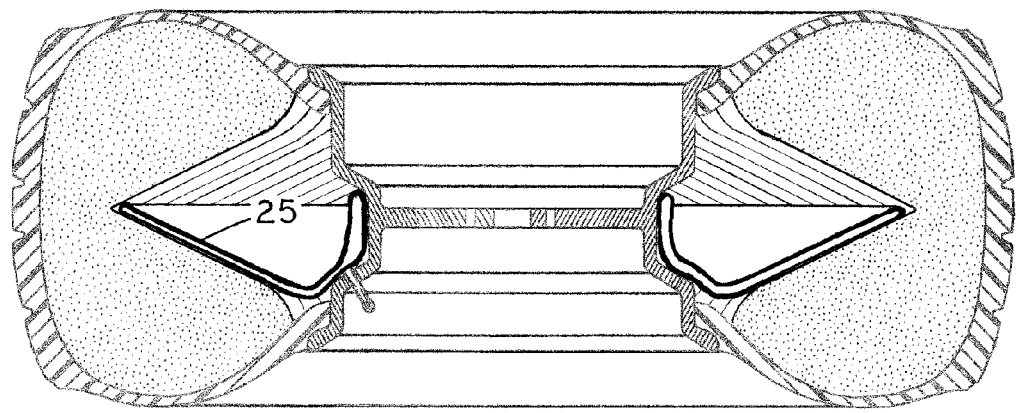
Figure 8:
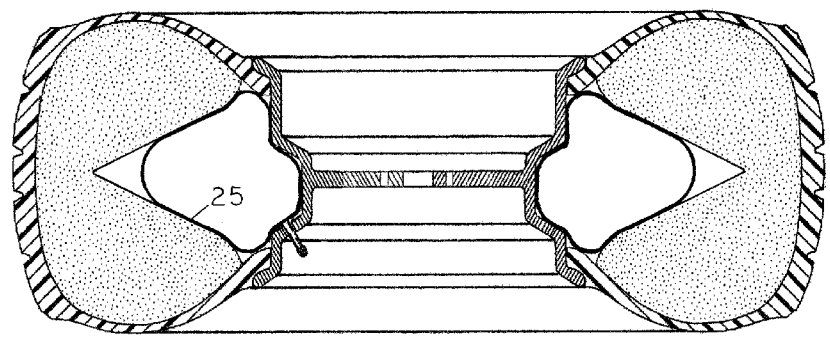
FIG. 8 is the cross sectional view of the tire and wheel assembly shown in FIG. 7, showing the conventional inner tube thrusting towards the wheel during initial pressurization.
Figure 9:
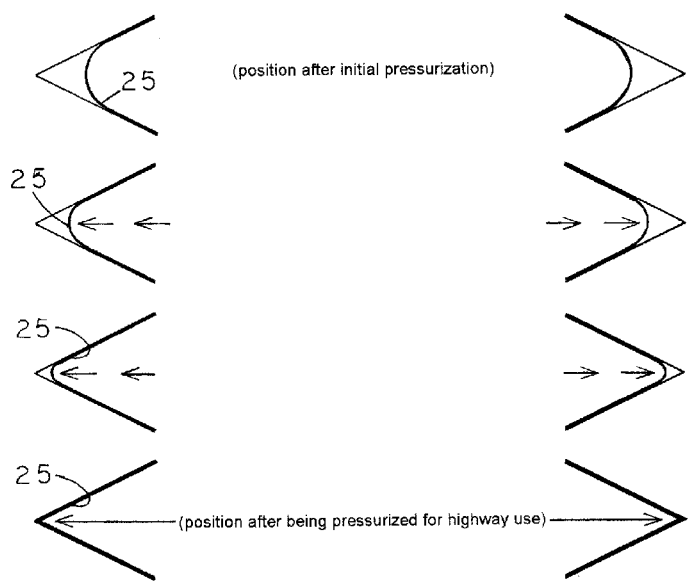
FIG. 9 is an illustration of the conventional round inner tube stretching back toward the bottom of the vee shaped air chamber as the air pressure increases.

The portion of the Air Bladder of the present invention that is in contact with the tire liner may be strengthened with fiber reinforcement. This is depicted in FIG. 5. FIG. 5 is a partial view of the Air Bladder of the present invention that is parallel to the rotational axis of the tire. In FIG. 5 there is shown the Air Bladder of the present invention 3 and individual reinforcing fibers 7. FIG. 5 shows one example of the orientation of the fiber reinforcement where reinforcing fibers 7 extend from the top/widest part of the vee shaped air chamber, to the bottom of the vee and up the other side to the top of the vee, i.e., the area of the Air Bladder of the present invention that contacts the tire liner. Individual reinforcing fibers 7 shown in FIG. 5 would continue 360° all the way around to reinforce the entire Air Bladder of the present invention 3. FIG. 5 is one possible example of fiber orientation. Any fiber orientation or fiber pattern desired could be implemented when reinforcing the Air Bladder of the present invention with fibers. Kevlart® or any other suitable type of fiber may be used for the reinforcement of the Air Bladder of the present invention.

What is claimed is:

1. An assembly comprising:
   a. a pneumatic tire mounted on a wheel;
   b. a tire liner that is lining the interior of said pneumatic tire;
   c. said tire liner creating a vee shaped portion of the air chamber in the interior of said mounted pneumatic tire;
   d. an air bladder sealing said air chamber, whereby said air bladder precludes any pressurized gas from coming between the interior surface of said pneumatic tire and said tire liner;
   e. said air bladder being made of an elastomeric material;
   f. said air bladder having a molded vee shaped portion prior to being incorporated into said assembly, said molded vee shaped portion of said air bladder conforming to said vee shaped portion of said air chamber, whereby said air bladder does not have to be pressurized in said air chamber in said assembly to assume the vee shape of said portion of said air chamber.

2. The assembly of claim 1, wherein said elastomeric material is a low heat build-up polyurethane elastomer compound.

3. The assembly of claim 1, wherein said air bladder is reinforced with fibers.

4. An assembly comprising:
   a. a pneumatic tire mounted on a wheel;
   b. a tire liner that is lining the interior of said pneumatic tire;
   c. said tire liner creating a vee shaped portion of the air chamber in the interior of said mounted pneumatic tire;
   d. an air bladder sealing said air chamber, whereby said air bladder precludes any pressurized gas from coming between the interior surface of said pneumatic tire and said tire liner;
   e. said air bladder being made of an elastomeric material;
   f. said air bladder having a molded vee shaped portion prior to being incorporated into said assembly, said molded vee shaped portion of said air bladder conforming to said vee shaped portion of said air chamber, whereby said air bladder does not have to be pressurized in said air chamber in said assembly to assume the vee shape of said portion of said air chamber;

g. said air bladder having a molded semicircular shaped portion prior to being incorporated into said assembly, said semicircular shaped portion of said air bladder contacting said wheel when incorporated in said assembly and said semicircular shaped portion of said air bladder having a sufficient radius to provide sufficient material to contact the entire surface of said wheel when said air bladder is incorporated in said assembly, whereby said semicircular shaped portion of said air bladder can accommodate a variety of wheel shapes.

5. The assembly of claim 4, wherein said elastomeric material is a low heat build-up polyurethane elastomer compound.

6. The assembly of claim 4, wherein said air bladder is reinforced with fibers.

* * * * *